US009489102B2

(12) United States Patent
Samadani et al.

(10) Patent No.: US 9,489,102 B2
(45) Date of Patent: Nov. 8, 2016

(54) SYSTEM AND METHOD OF MODIFYING LIGHTING IN A DISPLAY SYSTEM

(75) Inventors: Ramin Samadani, Palo Alto, CA (US); Ian N Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1407 days.

(21) Appl. No.: 12/914,579

(22) Filed: Oct. 28, 2010

(65) Prior Publication Data

US 2012/0098806 A1    Apr. 26, 2012

Related U.S. Application Data

(63) Continuation-in-part of application No. PCT/US2010/053860, filed on Oct. 22, 2010.

(51) Int. Cl.
*G06F 3/038* (2013.01)
*G09G 5/00* (2006.01)
*G06F 3/048* (2013.01)

(52) U.S. Cl.
CPC ....... *G06F 3/048* (2013.01); *G09G 2320/0626* (2013.01); *G09G 2360/144* (2013.01)

(58) Field of Classification Search
CPC .................. G06F 3/011–3/014; G06F 3/017; G06F 3/048; G06F 3/04815; G09G 2360/14–2360/16; G09G 2320/06–2320/0693
USPC ........ 345/7–9, 204–215, 690–699, 176, 156, 345/633–634; 382/291, 103; 715/700–866
See application file for complete search history.

(56) References Cited

U.S. PATENT DOCUMENTS

| 4,997,263 | A | * | 3/1991 | Cohen et al. | 349/11 |
| 5,252,950 | A | * | 10/1993 | Saunders et al. | 345/9 |
| 5,266,930 | A | * | 11/1993 | Ichikawa et al. | 345/8 |
| 6,481,851 | B1 | * | 11/2002 | McNelley et al. | 353/28 |
| 6,710,797 | B1 | * | 3/2004 | McNelley et al. | 348/14.16 |

(Continued)

FOREIGN PATENT DOCUMENTS

WO    WO-2010007426 A2    1/2010

OTHER PUBLICATIONS

Nishina et al~"Photometric Registration by Adaptive High Dynamic Range Image Generation for Augmented Realty"~IEEE Int'l Symp Mixed & Augmented Reality Sep. 2008~4 pages.

(Continued)

*Primary Examiner* — Amr Awad
*Assistant Examiner* — Roberto Flores
(74) *Attorney, Agent, or Firm* — HP Inc. Patent Department

(57) ABSTRACT

The present invention describes a display system. The display system includes a display, the display including a display screen capable of operating in a transparent mode; a lighting characteristic assessment component for determining the lighting characteristics of the content on the display screen and the lighting characteristics behind the display screen; and an adaptive lighting control component for controlling of an at least one lighting source and the lighting characteristics of the content on the display screen, wherein based on a comparison of the lighting characteristics of the content on the display screen and the lighting characteristics behind the display screen, modifying at least one of the lighting characteristics of the content on the display screen or the lighting characteristics of the at least one lighting source.

20 Claims, 7 Drawing Sheets

(56) References Cited

U.S. PATENT DOCUMENTS

| | | |
|---|---|---|
| 6,771,294 B1* | 8/2004 | Pulli et al. .................... 715/863 |
| 2002/0044152 A1* | 4/2002 | Abbott, III ............. G06T 11/00 345/629 |
| 2003/0142068 A1 | 7/2003 | DeLuca et al. |
| 2004/0165060 A1* | 8/2004 | McNelley .......... G02B 27/2292 348/14.08 |
| 2005/0041009 A1* | 2/2005 | Kuroda ................ G02F 1/1335 345/102 |
| 2005/0046953 A1 | 3/2005 | Repetto et al. |
| 2005/0083713 A1 | 4/2005 | Boks |
| 2005/0166163 A1* | 7/2005 | Chang et al. ................ 715/863 |
| 2006/0017654 A1 | 1/2006 | Romo et al. |
| 2007/0164988 A1* | 7/2007 | Ryu et al. .................... 345/156 |
| 2007/0236485 A1 | 10/2007 | Trepte |
| 2007/0291008 A1* | 12/2007 | Wigdor ................ G06F 1/1613 345/173 |
| 2008/0018555 A1* | 1/2008 | Kuo et al. ........................ 345/8 |
| 2008/0024523 A1 | 1/2008 | Tomite et al. |
| 2008/0084395 A1* | 4/2008 | Dawson ................ G06F 1/1632 345/168 |
| 2008/0211813 A1 | 9/2008 | Jamwal et al. |
| 2008/0211832 A1* | 9/2008 | Kumon ........................ 345/641 |
| 2008/0212196 A1* | 9/2008 | Kumon ................. B60K 35/00 345/641 |
| 2008/0218434 A1* | 9/2008 | Kelly et al. ........................ 345/8 |
| 2008/0284729 A1* | 11/2008 | Kurtenbach et al. ......... 345/156 |
| 2009/0135135 A1* | 5/2009 | Tsurumi ....................... 345/156 |
| 2010/0045569 A1* | 2/2010 | Estevez et al. ................ 345/3.1 |
| 2010/0073404 A1* | 3/2010 | Brown et al. ................. 345/634 |
| 2010/0177035 A1* | 7/2010 | Schowengerdt et al. ..... 345/156 |
| 2010/0253593 A1* | 10/2010 | Seder et al. ....................... 345/7 |
| 2010/0277439 A1* | 11/2010 | Charlier et al. .............. 345/176 |
| 2010/0287500 A1* | 11/2010 | Whitlow et al. .............. 715/810 |

OTHER PUBLICATIONS

International Bureau, international Preliminary Report on Patentability, PCT/US2010/053860, May 2, 2013, 6 pages.

* cited by examiner

US 9,489,102 B2

SYSTEM AND METHOD OF MODIFYING LIGHTING IN A DISPLAY SYSTEM

CROSS-REFERENCE TO RELATED APPLICATION

This case is a continuation-in-part of the case entitled "An Augmented Reality Display System and Method of Display" filed on Oct. 22, 2010, having. Serial Number PCT/US2010/053860 which is hereby incorporated by reference in it's entirety.

BACKGROUND

The displays of some augmented reality systems superimpose virtual objects or information on a real scene or in combination with real objects. These systems do not always take into account the different lighting characteristics of the virtual or real objects. Because the lighting directions of the virtual and real environments may be different, the displays produced can appear unnatural.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

The display system described in the patent application "An Augmented Reality Display System and Method of Display" filed on Oct. 22, 2010, having Serial Number PCT/US2010/053860, allows the manipulation of real or virtual objects in a workspace behind a transparent display screen. The display system can be used to augment real objects manipulated behind the transparent screen using graphical information shown on the screen or the manipulation of a virtual object with one's hands behind the screen. To provide a convincing visual effect, the lighting of the objects (the physical object being manipulated, or the hands manipulating the physical object) should match the lighting of the content (augmented reality information) shown on the display screen. The present invention provides for a lighting control system that controls the lighting sources in the display system to light the workspace behind the display screen. The lighting is adaptively controlled to match the lighting of the objects behind the display screen to match the lighting of the content that is on the transparent display screen.

The present invention works by analyzing the lighting characteristics of the content displayed on the transparent display screen and the workspace behind the display screen. The lighting characteristics analyzed typically include at least the lighting color and lighting direction. Based on the lighting characteristics, the lighting is adaptively modified to match the lighting characteristics of the content on the display screen with the lighting characteristics of the area behind the screen. This matching of color characteristics should result in more realistic, natural looking scene that contains both virtual and real elements.

Figure 1:
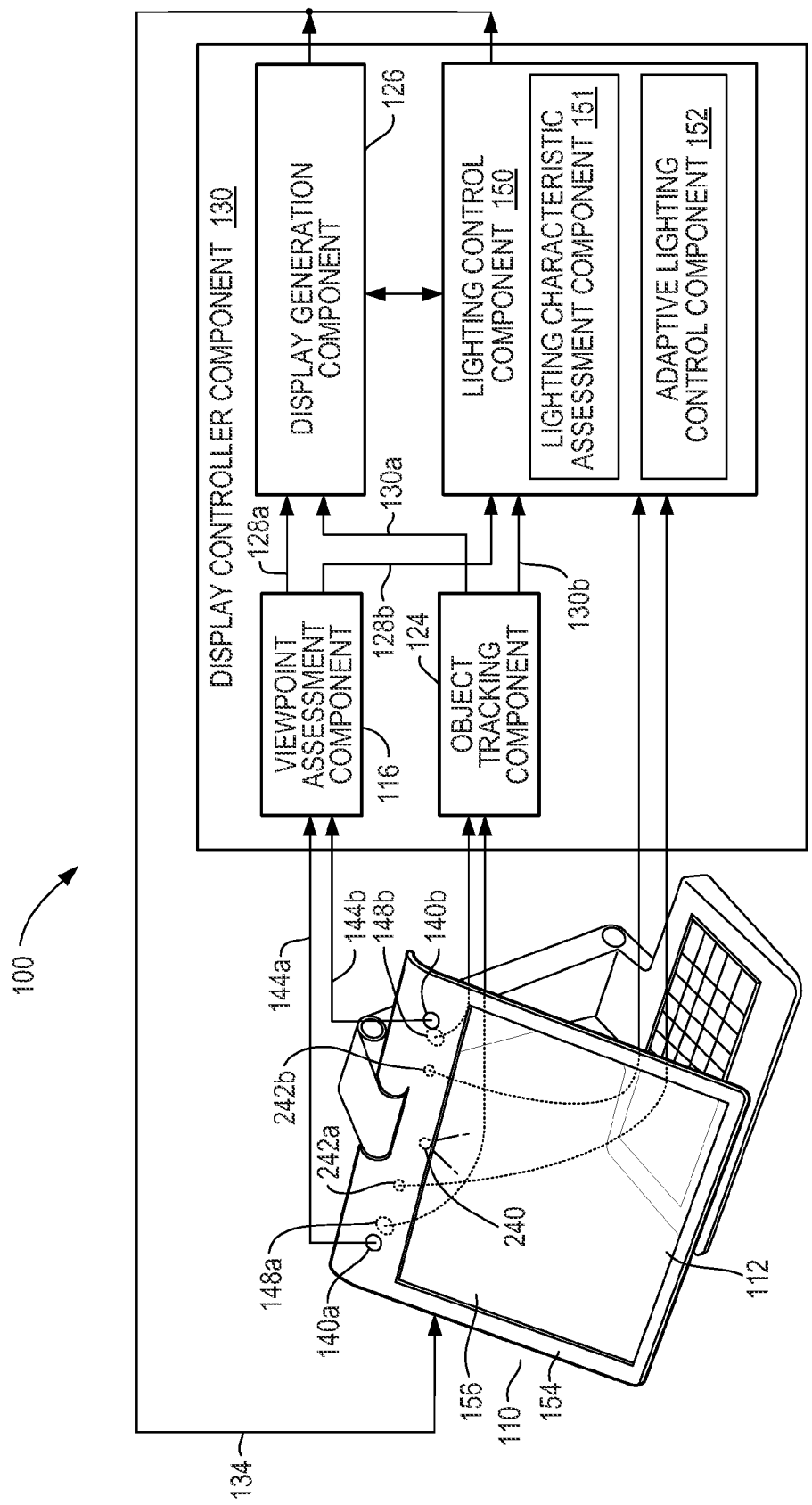
FIG. 1 illustrates a block diagram of a front view of a display screen in an augmented reality display system with an adaptive lighting system according to an embodiment of the invention.

The present invention describes a system and method of modifying lighting in a display system. Referring to FIG. 1 shows a block diagram of a front view of a display screen in an augmented reality display system with an adaptive lighting system. The display system 100 is comprised of: a display 110, including a transparent display screen 112; a lighting control component 150 including a lighting characteristic assessment component 151 and an adaptive lighting control component 151. The lighting characteristic assessment component 151 is used for determining (1) the lighting characteristics of the content displayed on the display screen and (2) the lighting characteristics behind the display screen. The adaptive lighting control component compares lighting characteristics. Based on the results of the comparison, the lighting sources in the display system can be adaptively modified to change the lighting conditions behind the transparent display screen.

The display 110 includes a display screen 112 that is comprised of a transparent screen material. Different screen materials may be used to provide the transparent display screen 112. In one embodiment, the transparent display screen is a transparent OLED (organic light-emitting diode) screen. In an alternative embodiment, the display screen is comprised of transparent LCDs (liquid crystal display). However, the transparent LCD screen implementation assumes a well lit working environment. In a third alternative embodiment, the display screen is comprised of a partially diffusing material and the content is projected onto the partially diffusing material. Although alternative materials and implementations are possible, the transparent display screen operates so that objects positioned behind the display screen 112 can be easily seen or viewed by a user 142 positioned in front of the display screen 112. The transparent display screen allows the user 142 to have a clear view of the object 120 (or objects) behind the screen that are being manipulated in real time and to instantaneously see the effect of their manipulation on the display 112.

In one embodiment, the lighting characteristics behind the display screen are determined by measuring the lighting characteristics of the ambient lighting environment using lighting sensors 242 with no lighting sources 240 in the on state. In an alternative embodiment, the lighting characteristics or lighting environment behind the screen are known. In one embodiment, for example, a user or system administrator could input the behind the screen display conditions. In one embodiment, the know conditions are preprogrammed. For example, in one case the lighting behind the screen might be a "dark environment", or "daylight color temperature at predetermined intensity". For these preprogrammed known conditions, the display system would use the preprogrammed conditions as input when determining the lighting characteristics behind the screen. In addition, custom settings might be programmed to specify the conditions behind the screen.

Once the lighting characteristics are determined, the lighting characteristics may be modified based on the comparison of the lighting characteristics behind the display screen and the lighting characteristics of the content on the display screen. In one case, the behind screen lighting characteristics are modified using the lighting sources 242. In one embodiment, the present invention uses at least a single light source to modify the lighting environment behind the transparent display screen. In the embodiment shown in FIG. 1, a single light source 240 is shown, however, there may be a plurality of light sources 240*a*-240*l* used as shown in the embodiment illustrated by FIG. 2C where a plurality of light sources are used. The embodiment in the FIGS. 1 and 2A-2C show the lighting sources embedded in the bezel, however, other positions are possible as long as they are positioned to be able to light the workspace without significant interference from the displayed content or the users.

A single type of light source may be used, or varying light sources with different lighting characteristic may be used. Most often, the goal is to use the light sources available and the controls available, (e.g. turning on and off, dimming, etc.), to match the lighting characteristics of the content displayed on the screen as closely as possible by modifying the lighting characteristics of workspace behind the display screen.

The lighting source can be any source that can light the work area behind the display screen. In one embodiment, the light sources are LEDs. In another embodiment the light sources are LEDs pus a gel color filter. In one embodiment, the light source allows for various colors of illumination. In another embodiment, the light sources are white bulbs. In one embodiment, the lighting source is a picoprojector. If an LEDs is used as the light source, it does not allow the casting of a shadow. But since picoprojector allow the projection of a pattern, a picoprojector could be used to cast a pattern of a shadow that corresponds to an object. Pico projectors are especially useful in application where instead of uniform light (given off for example by LEDs), a patterned light output is desirable.

One embodiment of the present invention includes viewpoint assessment sensors 140*a*, 140*b*, object tracking sensors 148*a*, 148*b* and lighting characteristic sensors 242*a*, 242*b*. Referring to FIGS. 1, 2A-2C, data from the assessment sensors 140*a*, 140*b*, object tracking sensors 148*a*, 148*b* and lighting characteristic sensors 242*a*, 242*b* is input into the display controller component 130. Specifically with respect to FIG. 1, viewpoint assessment sensor output data 144*a* and 144*b* is input to the display controller component 130; object tracking sensor output data 148*a*, 148*b* is input to the display controller component 130; and lighting characteristic sensor output data 242*a*, 242*b* is input to the display controller component 130.

Figure 2A:
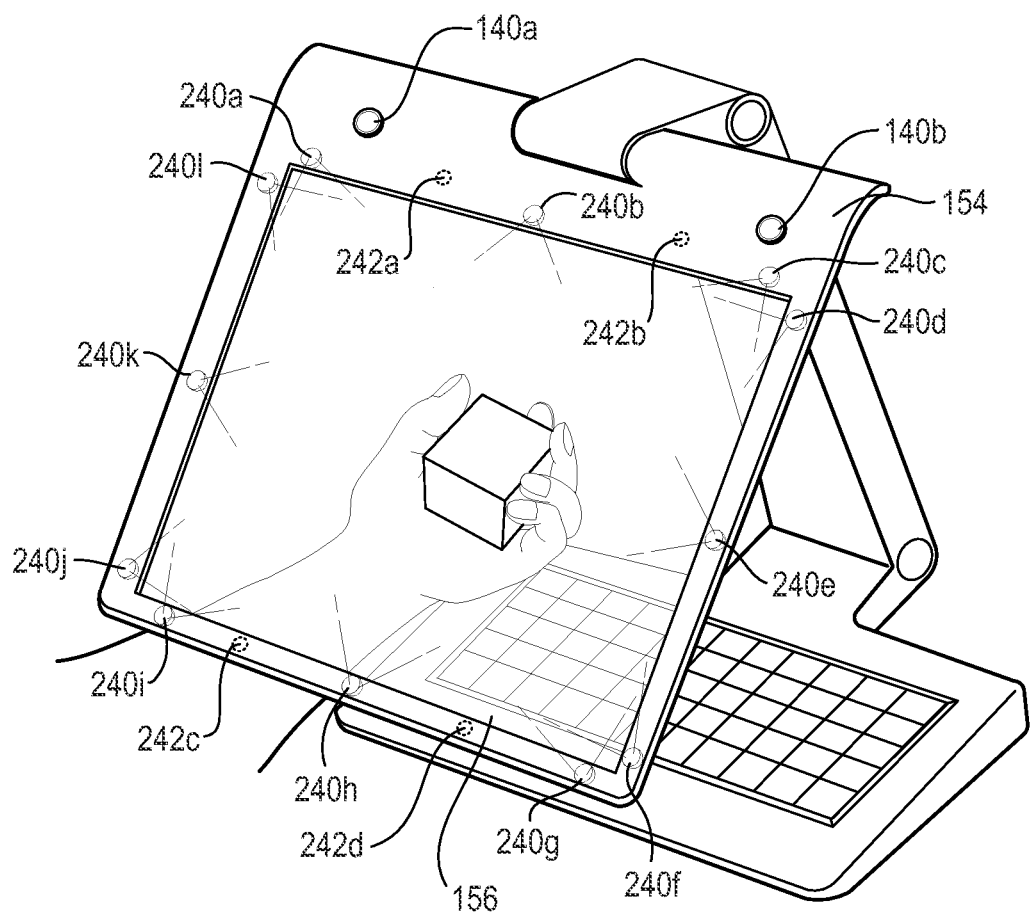
FIG. 2A shows a front perspective view of a desktop version of a display system with an adaptive lighting system according to an embodiment of the invention.
Figure 2B:
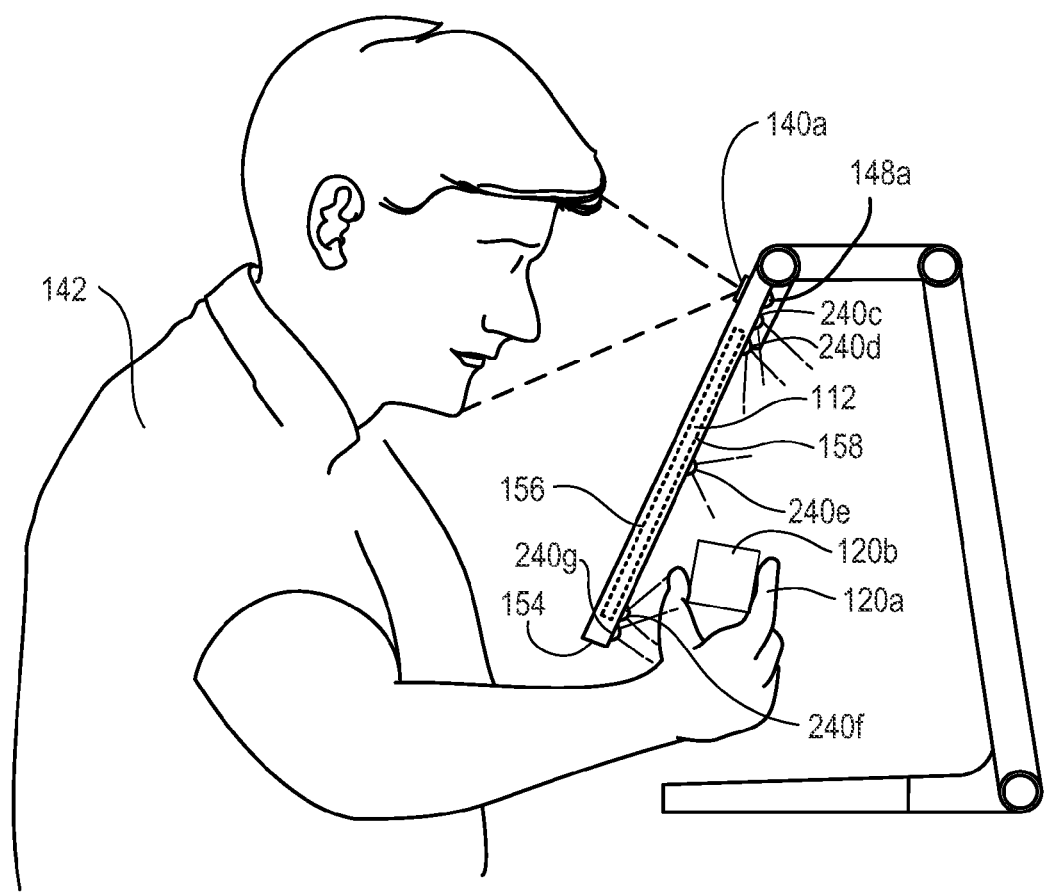
FIG. 2B shows a side view of a desktop version of a display system with an adaptive lighting system according to an embodiment of the invention.
Figure 2C:
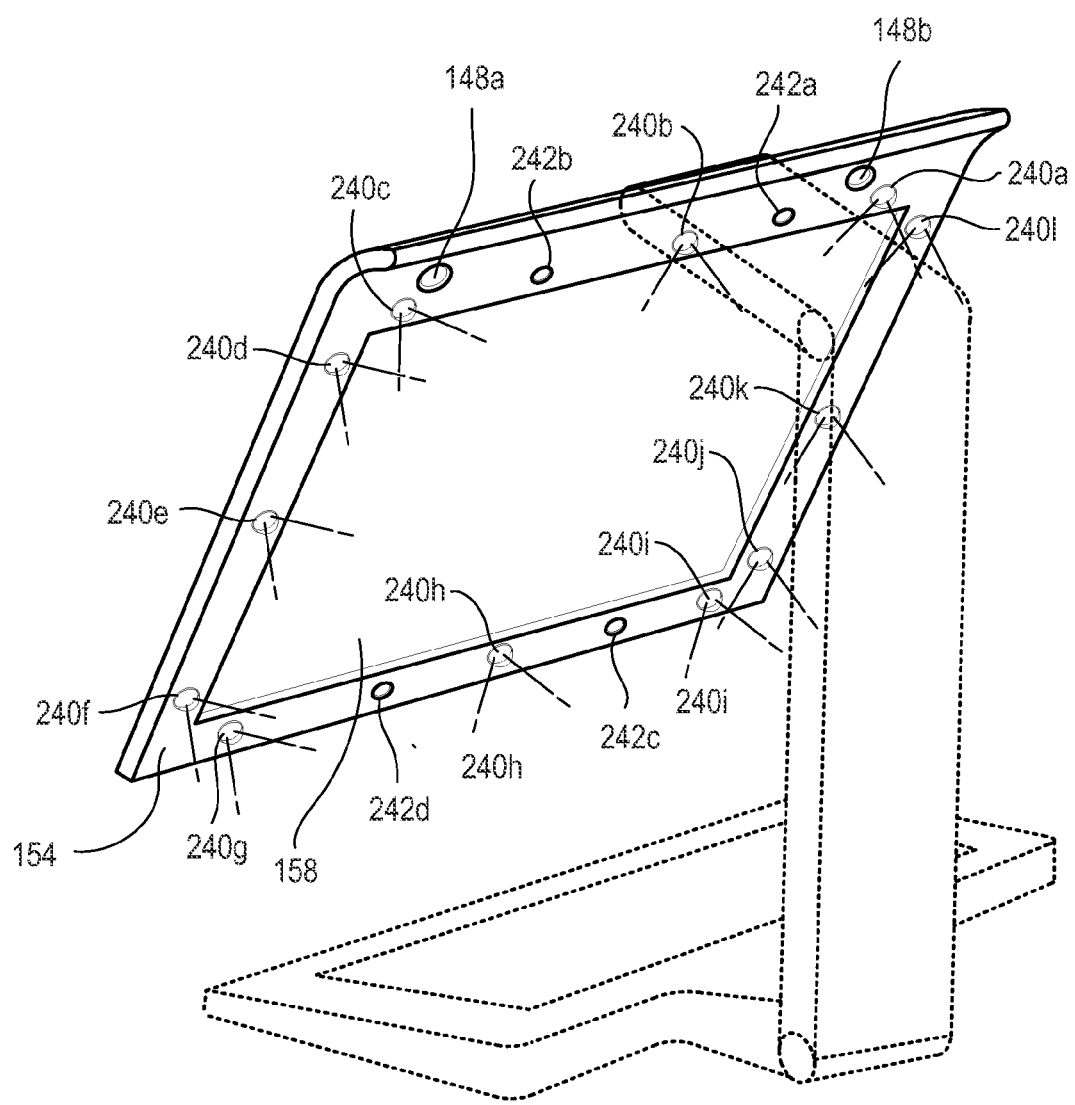
FIG. 2C shows a perspective back view of a desktop version of an display system with an adaptive lighting system according to an embodiment of the invention.

Referring to FIG. 1, shows viewpoint assessment sensors 140*a*, 140*b* positioned to face towards the user to capture the user's head position or facial detail. The viewpoint assessment sensor data 144*a*, 144*b* is used by the viewpoint assessment component 116 to determine the user's viewpoint. The display system 100 shown in FIG. 1 includes one or more object tracking sensors 148*a*, 148*b* covering the space behind the display screen to sense objects (including the user's hands) positioned behind the display screen. FIG. 2C shows a perspective back view of a desktop version of a display system according to an embodiment of the invention where the lighting source and object tracking sensors 148*a*, 148*b* can be more clearly seen.

In addition, the display system 100 shown in FIG. 1 also includes one or more light characterization sensors 242*a*, 242*b* covering the space behind the display screen. In one embodiment, the light characterization sensors 242*a*, 242*b* are used to sense the light characteristics of the light behind the display screen. In one embodiment, the light characterization sensors 242*a*, 242*b* are cameras that capture images of the area behind the display screen. The images captured by the camera can be analyzed to determine the lighting characteristics of the workspace behind the display screen.

FIG. 2C shows a perspective back view of a desktop version of a display system according to an embodiment of the invention where the lighting sources 240*a-l*, light characterization sensors 242*a-d* and object tracking sensors 148*a*, 148*b* can be more clearly seen. In the embodiment shown in FIG. 1, the outlines in dotted line representations of a light source 240 and light characterization sensors 242*a*, 242*b*. In FIG. 1, the dotted line representations are used to represent sensors which are actually physically located on the back side of the display system bezel. In the embodiment shown in FIG. 1, a single light source 240 is shown, however, there may be a plurality of light sources 240*a*-240*l*, as shown in FIG. 2C. Similarly, in the embodiment shown in FIGS. 1 and 2A-2C, show a plurality of light characterization sensors, however, if the light characterization has a large enough capture region (to capture the desired workspace area behind the display screen), a single light characterization sensor may be used.

In addition, the display system also can include a display generation component 126, wherein based on data 128 from the viewpoint assessment component 116 and data 130 from the object tracking component 124, the display generation component 126 creates content for the display on the display screen 112. The display controller component 130 outputs data 134 from at least the display generation component 126 to the display screen 112. Data (128*a*, 128*b*, 130*a*, 130*b*) output from the viewpoint assessment component 116 and the object tracking component 124 is used by the display generation component 126 to generate an image on the display screen that overlays or augments objects placed behind the screen.

The lighting control component 150 includes a lighting characteristic assessment component 151. Lighting characteristic information can be derived, for example, from a video frame or still photograph or from a graphical video frame description that are to be displayed on the display screen that overlays or augments objects placed behind the screen. From whatever the source (an image, data from image characteristic sensors, graphical video frames description or other source of image characteristic), lighting characteristics regarding the lighting at a location or region is determined. Common characteristics that are determined or computed are: lighting color, lighting direction and lighting intensity. When the source material is from a graphical source material, then this information may be explicitly available in the graphics rendering format, for example, that is sent to a GPU for rendering.

In one embodiment, the content displayed on the display screen is a graphical image created by a graphics rendering program. In this embodiment, lighting characteristics information may be derived from a file description of the image or alternatively from graphical commands sent to a GPU regarding the graphical commands. For example, lighting direction and lighting color information may be derived from a CAD file description of the generated image or the lighting commands sent to the GPU. During rendering, information is entered or provided to the graphics rendering program to render the desired image. This information (that may include lighting color, lighting direction, lighting intensity information) may be copied or otherwise used by the lighting assessment characteristic program to determine the lighting characteristics. Alternatively, one may intercept graphic commands send to display drivers to infer the lighting information from the graphical commands. The graphical commands can be reverse engineered to determine the lighting characteristics regarding the image.

Referring to FIG. 1, once the lighting characteristics of the content on the display screen and the lighting characteristics behind the display screen are determined, the lighting characteristics are compared. Based on the comparison results the adaptive lighting control component 152 may or may not utilize the lighting source (or sources) positioned to illuminate the workspace behind the display screen to modify the lighting source conditions behind the display screen. For example, the lighting source (or sources) may be used or alternatively, the contents on the display screen may be modified.

In one embodiment, the goal is to match the lighting characteristics of the image content by modifying the lighting characteristics of the workspace behind the display screen. The area behind the screen that is matched may be a single point location on an object or image or a defined region or area surrounding an object positioned behind the screen. The adaptive lighting control component 152 may control a single lighting source or a plurality of lighting sources. In some cases the lights can consist of separate red, green and bliue, light sources that allow for various colors of illumination. In this case a single RGB color component of the lighting source may be modified. In some instances, the lighting control component 152 may vary the at least one lighting source 240 dependent upon the type of display used, as different display have different display characteristics.

In one embodiment, the content displayed on the transparent display screen 112 is an overlaid image. The display system 100 creates an "overlaid" image on the display screen 112—where the overlaid image is an image generated on the transparent display screen that is between the user's viewpoint and the object 120 behind the screen that it is "overlaid" on. Details regarding how the overlaid image is generated is described in greater detail in the patent application having the title "An Augmented Reality Display System and Method of Display" filed on Oct. 22, 2010, having Serial Number PCT/US2010/053860. The overlaid image generated is dependent upon the user's viewpoint. Thus, the position of the overlaid image with respect to the object behind the display screen stays consistent even as the user moves their head and/or the object behind the display screen.

Figure 3:
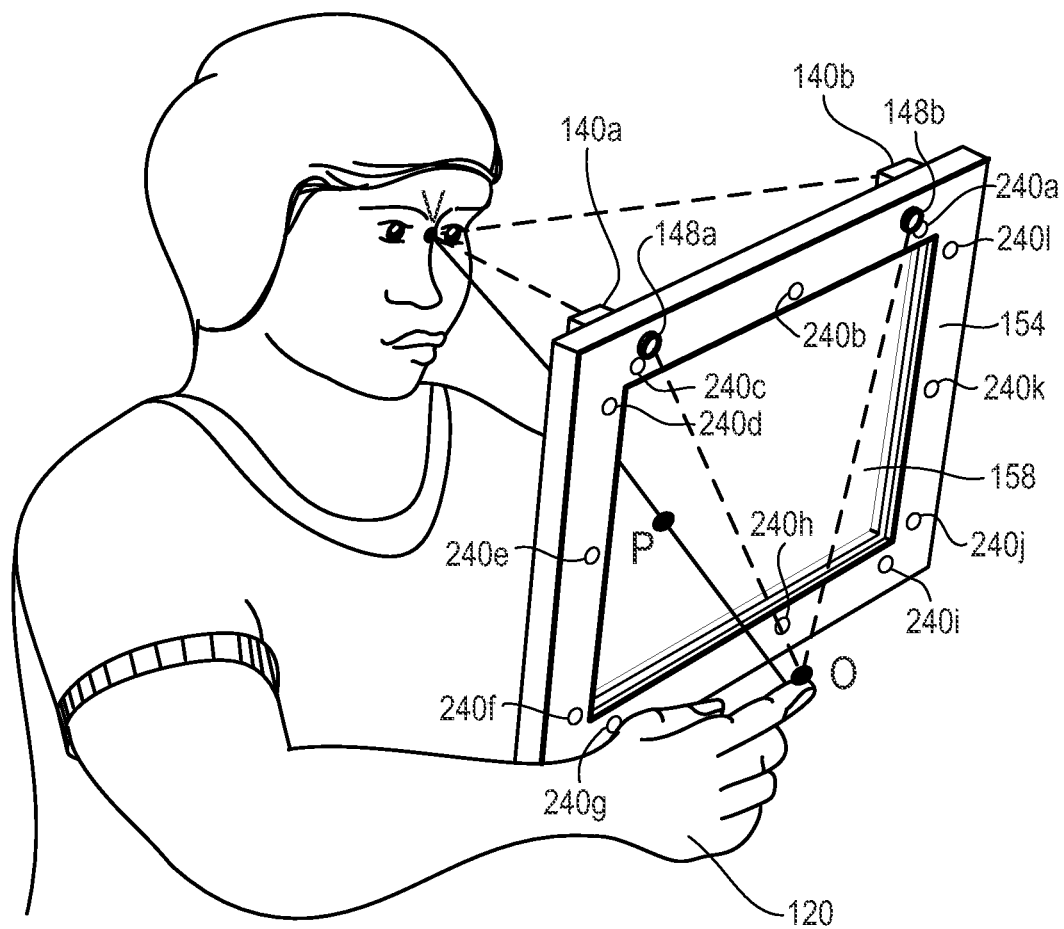
FIG. 3 shows a view of the points required to generate the user's viewpoint according to one embodiment of the invention.

FIG. 3 shows a view of the points required to generate an overlaid image on the display screen according to one method. In one embodiment, the location designated by the symbol P is found by determining the line of sight (the line) between two points—where the two points are (1), the point "0", the location of the object behind the screen and (2), the point "V", the user's viewpoint. The display system can then determine the pixel locations (P) on the display screen that correspond to the user's line of sight between the two points. This allows the generated content on the display screen to be registered to real objects behind the screen. Further, the display system recognizes the position of the user's hands (in this case the object) with respect to the projected elements (content displayed on the display screen) in the scene.

With respect to determining, the location of the overlaid image—the user viewpoint may be determined based on data collected by the viewpoint assessment sensors. The location (and, optionally, shape and orientation) of an object behind a display screen may be determined based on data collected from at least one object tracking sensor. Content location for display on the display screen is based on the viewpoint with respect to the location of the object positioned behind the display screen—in one case by determining the line of sight between the user viewpoint location and the location of the object behind the display screen. For each pixel of the image location, the location of the displayed image is along the line of site on the plane of the display screen.

Figure 4:
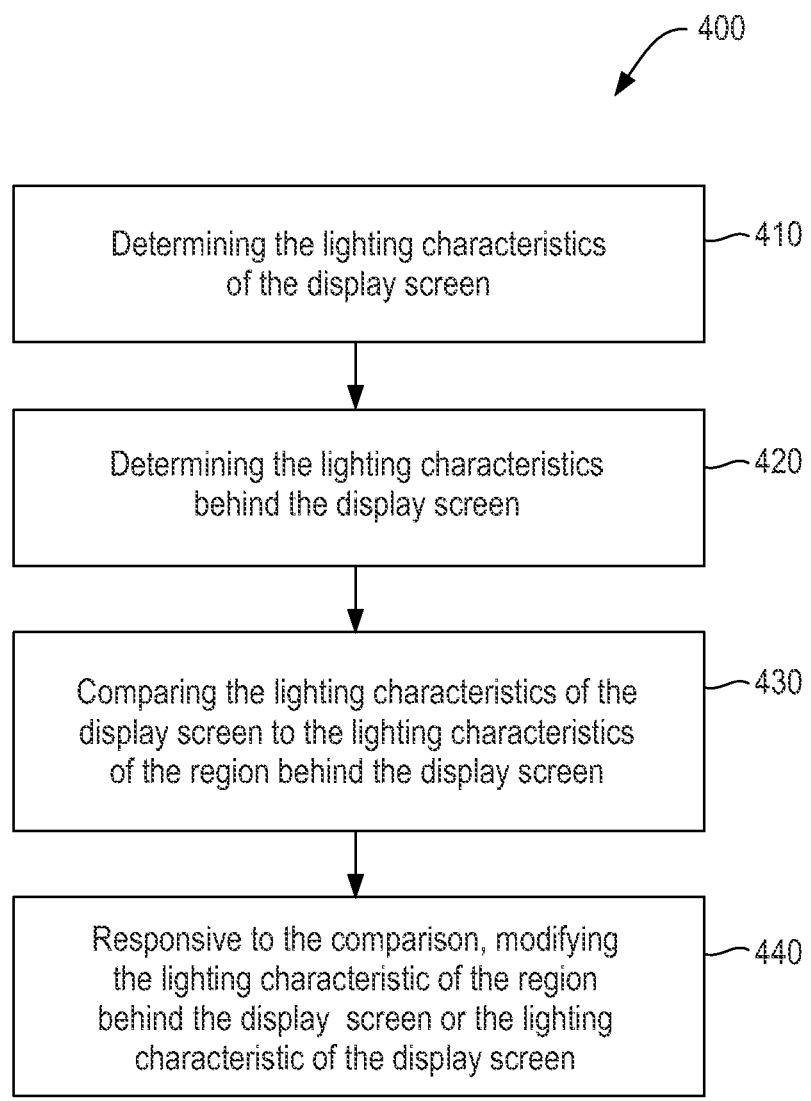
FIG. 4 shows a flow diagram for a method of adapting the lighting of an augmented reality display system according to an embodiment of the invention.

FIG. 4 shows a flow diagram for a method of adapting the lighting of an augmented reality display system according to an embodiment of the invention. Referring to FIG. 4, the method for modifying the lighting in the display system includes the steps of: determining the lighting characteristics of the content displayed on a transparent display screen (410); determining the lighting characteristics behind the transparent display screen (420); comparing the lighting characteristics of the content displayed on the transparent display screen to the lighting characteristics of the region behind the display screen (430); and responsive to the result of the comparison of the lighting characteristics of the content on the transparent display screen and the lighting characteristics behind the display screen, an at least one lighting source can be modified to change the lighting conditions behind the display screen.

In one case, lighting commands sent from the adaptive lighting control component are sent (output data line 134) to the display screen to control the at least one lighting source 240. The adaptive lighting component may include decision making component implemented in software or hardware which decides which lighting sources light the area behind the display screen get activated to most closely match content on the display screen. Which lighting sources get activated are dependent upon the lighting color, lighting intensity and lighting direction that can be provided by each lighting source. Further, the arrangement of the lighting sources, their ranges and intensity profiles also may be used to determine which lighting sources are activated.

Figure 5:
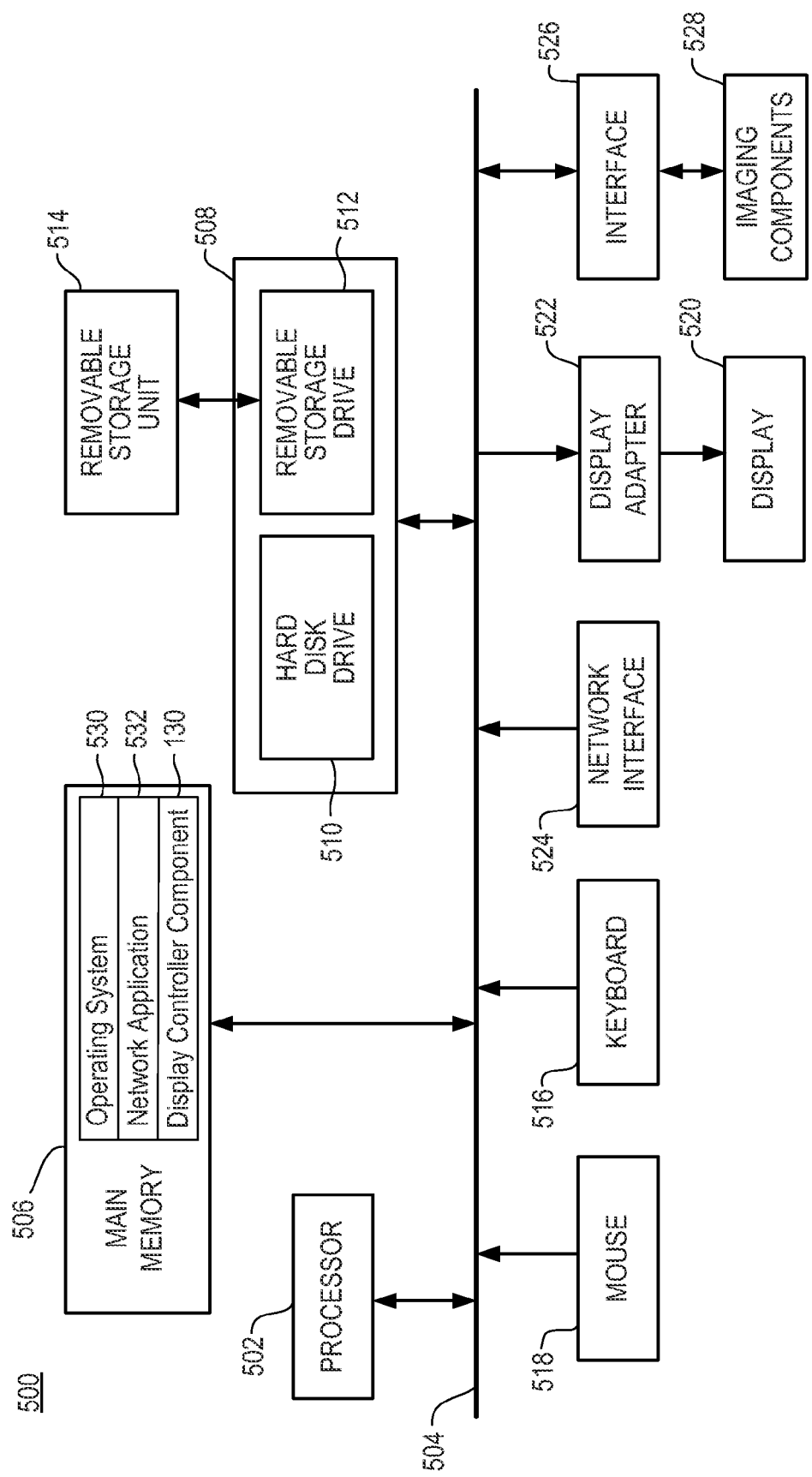
FIG. 5 shows a computer system for implementing the methods shown in FIG. 4 and described in accordance with embodiments of the present invention.

FIG. 5 shows a computer system for implementing the methods shown in FIG. 4 and described in accordance with embodiments of the present invention. It should be apparent to those of ordinary skill in the art that the method 400 represents generalized illustrations and that other steps may be added or existing steps may be removed, modified or rearranged without departing from the scopes of the method 400. The descriptions of the method 400 are made with reference to the system 100 illustrated in FIG. 1 and the system 500 illustrated in FIG. 5 and thus refers to the elements cited therein. It should, however, be understood that the method 400 is not limited to the elements set forth in the system 500. Instead, it should be understood that the method 400 may be practiced by a system having a different configuration than that set forth in the system 500.

Some or all of the operations set forth in the method 400 may be contained as utilities, programs or subprograms, in any desired computer accessible medium. In addition, the method 400 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

FIG. 5 illustrates a block diagram of a computing apparatus 500 configured to implement or execute the methods 400 depicted in FIGS. 1-3, according to an embodiment of the present invention. In this respect, the computing apparatus 500 may be used as a platform for executing one or more of the functions described hereinabove with respect to the display controller component 130.

The computing apparatus 500 includes one or more processor(s) 502 that may implement or execute some or all of the steps described in the method 400. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard drives 510 and/or a removable storage drive 512, representing a removable flash memory card, etc., where a copy of the program code for the method 500 may be stored. The removable storage drive 512 reads from and/or writes to a removable storage unit 514 in a well-known manner.

Exemplary computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any electronic device and/or system capable of executing the functions of the above-described embodiments are encompassed by the present invention.

Although shown stored on main memory 506, any of the memory components described 506, 508, 514 may also store an operating system 530, such as Mac OS, MS Windows, Unix, or Linux; network applications 532; and a display controller component 130. The operating system 530 may be multi-participant, multiprocessing, multitasking, multi-threading, real-time and the like. The operating system 530 may also perform basic tasks such as recognizing input from input devices, such as a keyboard or a keypad; sending output to the display 520; controlling peripheral devices, such as disk drives, printers, image capture device; and managing traffic on the one or more buses 504. The network applications 532 includes various components for establishing and maintaining network connections, such as software for implementing communication protocols including TCP/IP, HTTP, Ethernet, USB, and FireWire.

The computing apparatus 500 may also include an input devices 516, such as a keyboard, a keypad, functional keys, etc., a pointing device, such as a tracking ball, cursors, etc., and a display(s) 520, such as the screen display 110 shown for Example in FIGS. 1-3. A display adaptor 522 may interface with the communication bus 504 and the display 520 and may receive display data from the processor 502 and convert the display data into display commands for the display 520.

The processor(s) 502 may communicate over a network, for instance, a cellular network, the Internet, LAN, etc., through one or more network interfaces 524 such as a Local Area Network LAN, a wireless 802.11x LAN, a 3G mobile WAN or a WiMax WAN. In addition, an interface 526 may be used to receive an image or sequence of images from imaging components 528, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:
1. A display system comprised of:
a display including a display screen for operating in at least a transparent mode used to augment with graphical information content on the display screen an object manipulated behind the display screen by a user;
a lighting characteristic assessment component for determining the lighting characteristics, including lighting direction, of the content on the display screen and the lighting characteristics, including lighting direction, behind the display screen;
a viewpoint assessment sensor on the display positioned to capture a facial detail of the user and to determine a viewpoint of the user;
at least one object tracking sensor to sense the position of the object behind the display screen and the position of the content is dependent on the viewpoint of the user and the position of the object; and
an adaptive lighting control component to control an at least one lighting source to cast a pattern of a shadow that corresponds to the object to allow the lighting characteristics of the content on the display screen to match the lighting characteristics of the object behind the display screen to create a realistic natural looking scene that contains both virtual and real elements, wherein the at least one lighting source and the facial detail of the user are located on opposite sides of the display screen, and the adaptive lighting control component to modify the lighting characteristics of the at least one lighting source in response to a comparison of the lighting characteristics of the content on the display screen and the lighting characteristics behind the display screen.

2. The display system recited in claim 1 wherein the at least one lighting source is modified to match the lighting characteristics behind the display screen with the lighting characteristics of the contents on the display screen at a defined region surrounding the object behind the screen.

3. The display system recited in claim 1 wherein the lighting characteristics behind the display screen are known and a description of the known lighting characteristics is input to the lighting characteristic assessment component.

4. The display system recited in claim 3 wherein the lighting characteristics of the content on the display screen are modified to match the known lighting characteristics behind the display screen.

5. The display system recited in claim 1 wherein the viewpoint assessment component to determine the viewpoint of the user positioned in front the display screen; the object tracking component to track user manipulation of the object positioned behind the display screen; and further including a display generation component, wherein based on data from the viewpoint assessment component and the object tracking component, the display generation component creates the graphical information content for display on the display screen registered to the object behind the display screen and dependent upon the viewpoint of the user.

6. The display system recited in claim 1 further including at least one lighting characteristic sensor for measuring the lighting characteristics behind the display screen.

7. The display system recited in claim 6 wherein the at least one lighting characteristic sensor is an image capture device.

8. The display system recited in claim 1 wherein the position of the content is determined by a line of sight between a location of the user viewpoint and a location of the object behind the display screen.

9. The display system recited in claim 1 wherein the at least one lighting source is a picoprojector.

10. A tangible non-transitory computer readable storage medium having computer readable program instructions stored thereon for causing a computer system to perform instructions, the instructions comprising the steps of:
  augmenting with graphical information content on a display screen an object manipulated by a user behind the display screen wherein the object is on an opposite side of the display screen from which the user is to face;
  determining a viewpoint of the user using a viewpoint assessment component on the display positioned to capture a facial detail of the user;
  sensing the object behind the display screen with at least one object tracking component and positioning the content dependent on the viewpoint of the user;
  determining the lighting characteristics, including a first lighting direction, of the content displayed on a display screen;
  determining the lighting characteristics, including a second lighting direction, behind the display screen, wherein an at least one lighting source of the display system and the facial detail of the user are located on opposite sides of the display screen;
  comparing the lighting characteristics of the content displayed on the display screen to the lighting characteristics of a region behind the display screen; and
  modifying the at least one lighting source to cast a pattern of a shadow that corresponds to the object or the content on the display screen to match the lighting of the object behind the display screen with the lighting of the content that is on the display screen to create a realistic natural looking scene that contains both virtual and real elements, wherein the modifying is performed in response to the result of the comparison of the lighting characteristics of the content on the display screen and the lighting characteristics of the region behind the display screen.

11. The tangible non-transitory computer readable storage medium recited in claim 10, wherein each of the lighting characteristics compared include at least the respective lighting direction and respective lighting colors.

12. The tangible non-transitory computer readable storage medium recited in claim 11, wherein each of the lighting characteristics compared further includes the respective lighting intensities.

13. The tangible non-transitory computer readable storage medium recited in claim 10 further including the step of modifying the at least one lighting source to match the lighting characteristics behind the display screen with the lighting characteristics of the contents on the display screen at a defined region surrounding the object behind the screen.

14. The tangible non-transitory computer readable storage medium recited in claim 10 further including the step of inputting a description of the known lighting characteristics to the lighting control component when the lighting characteristics behind the display screen are known.

15. The tangible non-transitory computer readable storage medium recited in claim 10 further including the steps of:
  tracking user manipulation of the object positioned behind the display screen; and
  creating the graphical information content with a display generation component for display on the display screen registered to the object behind the display screen and dependent upon the viewpoint of the user.

16. The tangible non-transitory computer readable storage medium recited in claim 15 wherein the step of generating graphical information content is based on data from the viewpoint assessment component and the object tracking component.

17. A method of modifying lighting in a display system comprising the steps of:
  augmenting with graphical information content on a display screen an object manipulated by a user behind the display screen wherein the object is on an opposite side of the display screen from which the user is to face;
  determining a viewpoint of the user using a viewpoint assessment component on the display positioned to capture a facial detail of the user;
  sensing the object behind the display screen with at least one object tracking component and positioning the content dependent on the viewpoint of the user;
  determining the lighting characteristics, including a first lighting direction, of the content displayed on a display screen;
  determining the lighting characteristics, including a second lighting direction, behind the display screen, wherein an at least one lighting source of the display system and the facial detail of the user are located on opposite sides of the display screen;
  comparing the lighting characteristics of the content displayed on the display screen to the lighting characteristics of a region behind the display screen; and
  modifying the at least one of lighting source to cast a pattern of a shadow that corresponds to the object or the content on the display screen to match the lighting of the object behind the display screen with the lighting of the content that is on the display screen to create a realistic natural looking scene that contains both virtual and real elements, wherein the modifying is performed in response to the result of the comparison of the lighting characteristics of the content on the display screen and the lighting characteristics of the region behind the display screen.

18. The method recited in claim 17, wherein each of the lighting characteristics compared include at least the respective lighting directions and respective lighting colors.

19. The method recited in claim 17 further including the step of modifying the at least one lighting source to match the lighting characteristics behind the display screen with the lighting characteristics of the contents on the display screen at a defined region surrounding the object behind the screen.

20. The method recited in claim 17 further including the step of inputting a description of the known lighting characteristics to the lighting control component when the lighting characteristics behind the display screen are known.

* * * * *